Jan. 30, 1968  SEIJIRO TAKEMURA ET AL  3,365,786
METHOD OF MANUFACTURING A MULTI-WALLED PRESSURE VESSEL
Filed Dec. 22, 1964
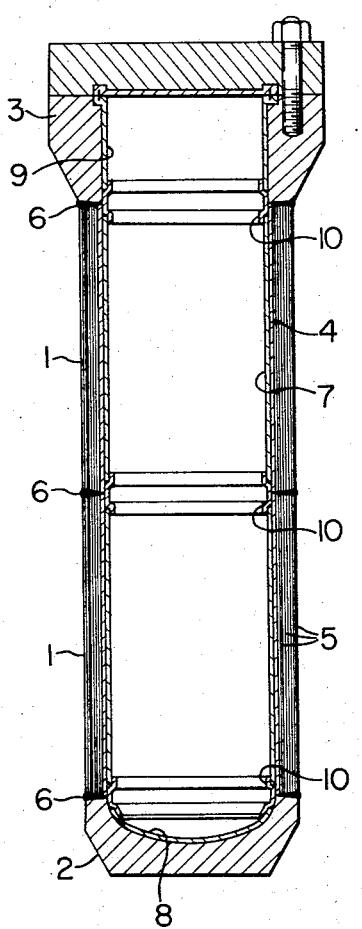
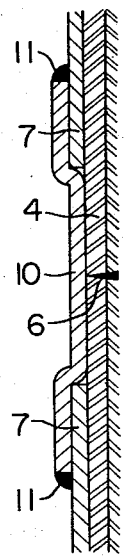
INVENTOR.
SEIJIRO TAKEMURA and TAKESHI YAMAUCHI.
BY
*Otto John Munz*
ATTORNEY.

_United States Patent Office_ 3,365,786
Patented Jan. 30, 1968

3,365,786
METHOD OF MANUFACTURING A MULTI-WALLED PRESSURE VESSEL
Seijiro Takemura and Takeshi Yamauchi, Kobe, Japan, assignors, by mesne assignments, to Kobe Steel Ltd., Kobe, Japan
Filed Dec. 22, 1964, Ser. No. 420,288
Claims priority, application Japan, Dec. 24, 1963, 38/69,197
2 Claims. (Cl. 29—446)

ABSTRACT OF THE DISCLOSURE

Method of making a corrosion-resistant pressure vessel by forming a cylinder of non-resistant steel thick enough to decrease in diameter only slightly when subject to the pressure of wrappings, inserting a thin lining of resistant material into the cylinder, and wrapping the core in the conventional manner sufficiently tightly to squeeze the cylinder into close contact with the lining. The lining may be joined to the cylinder only by the squeezing force of the wrapping.

Background of the invention

The present invention relates to a method of manufacturing a multi-walled pressure vessel having a lining covering its inner peripheral surface. The use of a multi-walled pressure vessel is often necessary in carrying out a reaction process under high pressure, and when the reaction substances are corrosive, a multi-walled pressure vessel provided with a special lining is often utilized. Usually a multi-walled pressure vessel is made with a base and a cover flange welded to opposite ends of a multi-walled cylindrical shell. The multi-walled cylindrical shell is usually produced by using a cylindrical member as a core and wrapping a steel strip around the outer periphery of said cylindrical core member the desired number of times. There are two methods of wrapping the steel strip. In one a steel strip is wrapped around the cylindrical member with the surfaces of the strip facing to each other kept in close contact with each other. In the other process one or two steel strips are wrapped around the cylindrical member successively, and the trailing edge of the preceding strip and the leading edge of the succeding strip which abutts against said trailing edge of the preceding strip are welded together, this procedure being repeated until the multi-walled construction is complete.

In the prior art, when lining of the desired corrosion-resistant metal is to be put over the inner peripheral surface of a multi-walled shell, said multi-walled shell is joined to a base and cover flange by welding at both its ends to complete the desired vessel, then said corrosion-resistant metal lining is made into cylindrical form and a number of such linings are inserted successively into said multi-walled shell each liner being in close contact with the adjacent inner peripheral surface of said shell and, lastly, the axial abutting edges of the cylindrical linings being welded together to form a complete multi-walled lining.

However, the welded portion tends to shrink after cooling, so that the lining tends to pull away from the inner surface of the shell, and as a result of the clearance between the lining and the inner surface of the multi-walled shell, the lining sometimes buckles inwardly of the inner space of said shell when a vacuum pressure exists in the vessel. Also, during welding of the lining, there is danger that heat will be transferred to the previously made welds 6, 6 in the multi-walled shell and the base and flange, thereby causing cracking of said welds.

If the lining is non-metal, it is usually attached to the vessel by means of lead, in which case it is necessary to preheat the entire pressure vessel to a high temperature and keep it at said temperature during the lining operation, a time consuming and troublesome operation; also, this step has the disadvantage of heating the previously welded portions of said pressure vessel.

Summary of the invention

Therefore an object of the present invention is to provide an improved method for lining pressure vessels which does not have the above mentioned disadvantages, characterized in that a cylindrical member provided with a lining plate therein is utilized as the core around which the steel strip is wrapped, so that multi-walled construction is formed on the outer peripheral surface of the cylindrical member.

Brief description of the drawing

The present invention will be described below in further detail in connection with the accompanying drawing which illustrates an apparatus embodying the principles of the present invention, wherein:

FIG. 1 is a longitudinal sectional view of an embodiment of a pressure vessel in accordance with the invention, and, FIG. 2 is an enlarged longitudinal sectional view showing the portion of the embodiment including the connecting ring for the lining shown in FIG. 1.

Description of the preferred embodiment

Referring to the drawings, a cylindrical core member 4 made of steel or the like is provided with a lining 7 made of the desired corrosion-resistant material.

The corrosion-resistant lining 7 is shaped in cylindrical form, so that it may be inserted within core member 4 in close contact with the inner peripheral surface thereof, and the abutting edges of said lining 7 are welded or coated by injection of molten corrosion-resistant material, and then steel strip 5 is wrapped around cylindrical core member 4 provided with lining 7 to form multi-walled shell 1. The compression resulting from the wrapping of strip 5 around core member 4 forces lining plate 7 into close contact with the inner peripheral surface of said cylindrical core member 4 thereby eliminating any clearance that might have existed.

Further, if a number of individual steel strips are successively wrapped around cylindrical core member 4 and the abutting edges of the individual strips are welded to form multi-walled shell 1 the welding (axial direction) causes shrinkage in shell 1 there by adding to the compressive force affected during the wrapping of the first strip, thereby bringing cylindrical core member 4 into even closer contact with lining 7. The compressive force exerted on lining 7 remains as residual compressive stress after completion of multi-walled shell 1. Said residual compressive stress functions as does the stress in prestressed concrete, that is, it serves to cancel the tensile force exerted outwardly when shell 1 is used under high pressure, thereby protecting the lining 7 from stress-corrosion.

A base 2 and a cover flange 3 which are also provided with linings 8 and 9 respectivley, are joined to the multi-walled shell 1, which is provided with lining by the above mentioned process, by means of conventional welds 6, 6. In case a long shell is required, two or more shells are buttwelded by means of additional welds 6. Finally, connecting rings 10 having shoulder portions and made of the same corrosion-resistant material as linings 7, 8 and 9 are used to join the shell 1 with the base 2 and the cover flange 3, with both ends of said rings 10 put around the end portions of the linings 7, 8 and 9 and welded, thereby joining the linings 7, 8 and 9 to seal the joined portions. It is also possible to stop depositing the welds 6 between the shell 1 and the base 2 or the cover flange 3 in halfway and to finish depositing these welds after deposition of the welds 11 is completed. This welding procedure has advantage in that thermal effects adversely affecting the connecting rings 10 can be minimized and tightening force is produced, and further it is possible to thus avoid thermal effect affecting welds 6. Instead of utilizing the connecting rings 10 for joining the linings, corrosion-resistant material can be injected in molten state to metallize the joined portions.

When the method of the present invention is carried out, a multi-walled shell can be fitted in close and uniform contact with its lining without leaving any clearance therebetween. Further only an easy operation is required for lining the shell, because the lining is formed before the multi-walled shell is formed around the cylindrical core member. As a result no welding of the lining is necessary after the completion of multi-walled shell, so there is no heat damage to the pressure vessel as occurs in the prior art. Also since the lining remains under stress created by the wrapping of the steel strip which makes up the multi-walled shell, the vessel is able to withstand high internal pressure. Lastly, the method of this invention in not restricted to metal linings but can also be used for linings of synthetic resin.

As mentioned above, the present invention is very useful as a method for lining multi-walled pressure vessels such as reaction towers and gas reservoirs in the chemical industry.

We claim:

1. The method of fabricating a pressure vessel suitable for containing corrosive fluid, comprising the steps of: rolling a cylindrical core of steel which is subject to attack by said corrosive fluid and welding its meeting edges; inserting a close-fitting cylindrical liner composed entirely of material which is resistant to attack by said corrosive fluid into said core; wrapping a shell consisting of at least one steel strip which is subject to attack by said fluid around said core sufficiently tightly to compress said core into close contact with said liner; and welding the meeting edges thereof while tightly wrapped, said liner being maintained in said core only by the compressive forces produced by said shell, and being so thin as to be collapsed by said compressive forces in the absence of said core, thereby forming a unitary side wall section; welding a base and a cover flange to the ends of said side wall section, said base and said cover flange being lined with the material of which said liner is composed; bridging the gaps between said side wall section and said base and cover flange with connecting portions of the material of which said liner is composed; and welding said connecting portions to said liner and to said base and said cover flange.

2. The method of forming a pressure vessel as claimed in claim 1 in which said base and said cover flange are welded to the ends of a plurality of said side wall sections which are themselves welded together in end-to-end relation, and which have connecting portions of the material of which said liner is composed welded over the joints between them.

References Cited

UNITED STATES PATENTS

| | | | |
|---|---|---|---|
| 1,925,118 | 9/1933 | Stresau | 29—471.1 X |
| 2,209,290 | 7/1940 | Watts | 29—471.1 X |
| 2,217,090 | 10/1940 | Zerbe | 220—3 X |
| 2,308,307 | 1/1943 | Robinson | 29—471.1 X |
| 2,331,504 | 10/1943 | Raymond et al. | 29—446 |
| 2,372,723 | 4/1945 | Jasper | 29—446 |
| 2,835,404 | 5/1958 | Andrus | 220—3 |
| 3,128,001 | 4/1964 | Schmitz | 220—3 |

CHARLIE T. MOON, *Primary Examiner.*